United States Patent
Szparagowski et al.

(10) Patent No.: US 11,760,933 B2
(45) Date of Patent: Sep. 19, 2023

(54) THERMALLY CONDUCTIVE ELECTRICALLY INSULATING THERMOPLASTIC MATERIALS

(71) Applicant: Freudenberg-NOK General Partnership, Plymouth, MI (US)

(72) Inventors: Raymond L. Szparagowski, Bowling Green, OH (US); Michael Blake, Northville, MI (US); Saikrishna Sundararaman, Canton, MI (US)

(73) Assignee: Freudenberg-NOK General Partnership, Plymouth, MI (US)

( * ) Notice: Subject to any disclaimer, the term of this patent is extended or adjusted under 35 U.S.C. 154(b) by 0 days.

(21) Appl. No.: 17/412,657

(22) Filed: Aug. 26, 2021

(65) Prior Publication Data

US 2023/0063020 A1 Mar. 2, 2023

(51) Int. Cl.
| | |
|---|---|
| *G02F 1/1333* | (2006.01) |
| *C09K 19/38* | (2006.01) |
| *C08K 3/38* | (2006.01) |
| *C08K 3/40* | (2006.01) |
| *C08K 7/14* | (2006.01) |
| *C08L 33/04* | (2006.01) |
| *C08L 33/24* | (2006.01) |
| *H02K 3/34* | (2006.01) |

(52) U.S. Cl.
CPC ............ *C09K 19/3838* (2013.01); *C08K 3/38* (2013.01); *C08K 3/40* (2013.01); *C08K 7/14* (2013.01); *C08L 33/04* (2013.01); *C08L 33/24* (2013.01); *H02K 3/345* (2013.01); *C08K 2003/385* (2013.01); *C08L 2203/202* (2013.01); *C08L 2207/04* (2013.01)

(58) Field of Classification Search
CPC .............. C09K 19/38; C09K 19/3833; C09K 19/3838; C08K 3/40; C08K 7/14; C08K 2003/385; C08L 33/04; C08L 33/24; C08L 2203/202; C08L 2207/04; H02K 3/345
See application file for complete search history.

(56) References Cited

U.S. PATENT DOCUMENTS

| | | | |
|---|---|---|---|
| 6,229,675 B1 | 5/2001 | Tanaka et al. | |
| 6,620,497 B2 * | 9/2003 | Smith | C08K 9/02 428/404 |
| 6,827,470 B2 * | 12/2004 | Sagal | F21V 29/505 362/255 |
| 7,189,778 B2 * | 3/2007 | Tobita | B29C 70/62 524/495 |

FOREIGN PATENT DOCUMENTS

| | | |
|---|---|---|
| EP | 2695914 A1 | 2/2014 |
| EP | 2824131 A1 | 1/2015 |
| JP | 2011020444 A | 2/2011 |
| WO | WO-2008043540 A1 | 4/2008 |
| WO | WO-2022/090051 A1 | 5/2022 |

OTHER PUBLICATIONS

Extended European Search Report for corresponding EP Application 22182733.0 dated Jan. 3, 2023 (7 pages).

* cited by examiner

*Primary Examiner* — Geraldina Visconti
(74) *Attorney, Agent, or Firm* — Daniel J. Sepanik, Esq.; Harness, Dickey & Pierce, P.L.C.

(57) ABSTRACT

Thermally conductive electrically insulating compositions and structures and devices comprising such materials. In various embodiments, such materials comprise liquid crystal polymer and fillers, wherein the fillers comprise boron nitride and glass fiber. In various embodiments, the liquid crystal polymer is selected from the group consisting of semi-aromatic copolyesters, copolyamides, polyester-co-amides, and mixtures thereof.

10 Claims, 4 Drawing Sheets

THERMALLY CONDUCTIVE ELECTRICALLY INSULATING THERMOPLASTIC MATERIALS

BACKGROUND

The present technology relates to thermoplastic compositions useful in electrical devices, such as in structures in electric motors. For example, such structures include electric motor bobbins.

A variety of electrical devices, such as motors, require insulating materials that are also thermally conductive. In particular, heat is generated in electric motors due to friction and winding losses (e.g., copper losses). Thermal management may play a critical role in performance and reliability of the motors. Demands may be particularly significant for motors used in electric vehicles, which require higher efficiency, increased power density, wider speed range and smaller size than many other motors.

In general, plastic is a good electric insulating material. Plastic may be readily formed into a variety of motor components, such as bobbins. However, the use of plastics in motors may present challenges because of poor thermal conductivity, particularly in motors used for electric vehicles. Accordingly, there is a need for thermally conductive electrically insulated materials for use in electric motors and other electric devices where thermal management is desired.

SUMMARY

The present technology provides thermally conductive electrically insulating (TCEI) compositions and structures and devices comprising such materials. In various embodiments, such TCEI materials comprise liquid crystal polymer and fillers, wherein the fillers comprise boron nitride and glass fiber. In various embodiments, the liquid crystal polymer (LCP) is selected from the group consisting of semi-aromatic copolyesters, copolyamides, polyester-co-amides, and mixtures thereof.

For example, the TCEI compositions may comprise from about 50% to about 70% of the LCP. In some aspects, compositions comprise from about 25% to about 40% of a boron nitride. In some aspects, compositions may comprise from about 5% to about 20% of a glass fiber. In some embodiments, TCEI compositions comprise
from about 55% to about 60% of liquid crystal thermoplastic;
from about 30% to about 35% of a boron nitride material; and
from about 10% to about 15% of glass fiber.

The present technology also provides insulating structures comprising TCEI materials of the present technology. Such structures include bobbins, slot liners, and encapsulating structures for motor end windings, and electrical wire buss bars.

DRAWINGS

FIGS. 1, 2 and 3 depict example electric motor structures of the present technology.

Figure 1A:
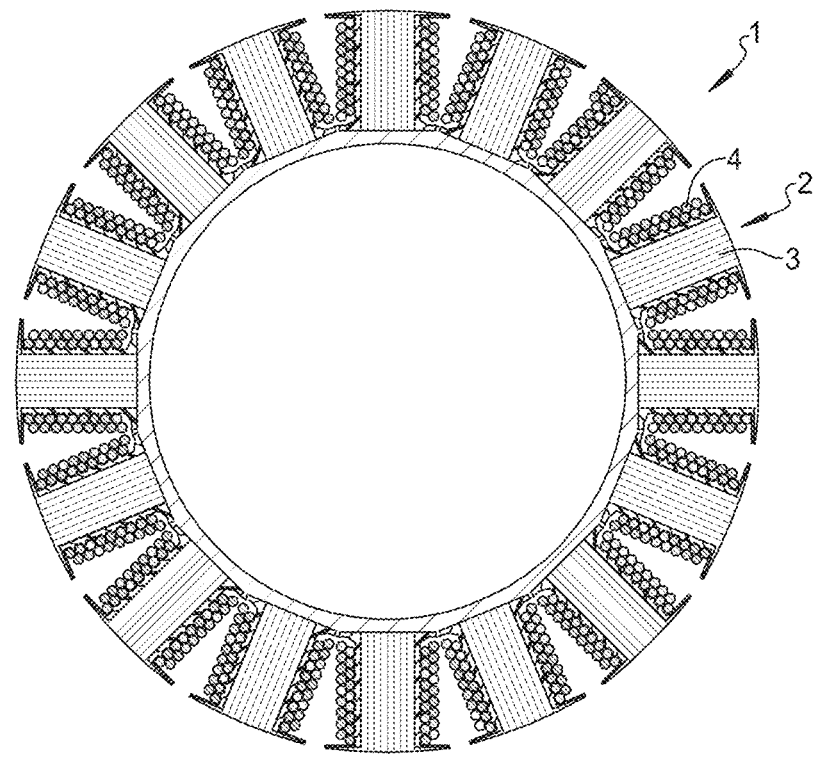
FIG. 1A is a cross sectional view of an electric motor stator comprising a plurality of bobbin structures of the present technology.

It should be noted that the figures set forth herein are intended to exemplify the general characteristics of devices among those of the present technology, for the purpose of the description of certain embodiments. These figures may not precisely reflect the characteristics of any given embodiment, and are not necessarily intended to define or limit specific embodiments within the scope of this technology.

DETAILED DESCRIPTION

The following description of technology is merely exemplary in nature of the subject matter, manufacture and use of one or more inventions, and is not intended to limit the scope, application, or uses of any specific invention claimed in this application or in such other applications as may be filed claiming priority to this application, or patents issuing therefrom. A non-limiting discussion of terms and phrases intended to aid understanding of the present technology is provided at the end of this Detailed Description.

As discussed above, the present technology provides thermally conductive electrically insulating materials. In various embodiments, such materials are useful for forming structures in electrical devices, such as electric motors.

TCEI Materials

In general, the present technology provides TCEI materials comprising liquid crystal thermoplastic and fillers.

Thermoplastics:

The compositions of the present technology comprise thermoplastic polymers, such as liquid crystalline polymers (LCPs). In general, LCPs exhibit properties between highly ordered solid crystalline materials and amorphous disordered liquids over a range of temperatures. In various embodiments, LCPs are thermotropic, and may have a nematic crystalline structure. LCPs among those useful herein include semi-aromatic copolyesters, copolyamides, and polyester-co-amides. For example, in some embodiments compositions comprise a copolyester, such as a copolyester of p-hydroxybenzoic acid and 6-hydroxy-2-naphthoic acid.

LCPs among those useful in various embodiments are commercially available. Examples include Vectra® A950 (an aromatic polyester) and Vectra® B950 (an aromatic polyesteramide), available from Celanese Corporation (Irving, Tex. USA).

In various embodiments, TCEI materials consist of or consist essentially of LCPs. For example, in some embodiments, TCEI materials contain no, or are essentially free, of other polymers, such as polyphenylene sulfides. One of ordinary skill in the art will understand that "essentially free" means that such compositions contain levels of such polymers that have no substantial effect on the properties of the materials, e.g., present (if at all) at levels under 1%, under 0.5%, under 0.1%, or under 0.05%.

Fillers:

The compositions of the present technology comprising one or more fillers, including ceramic fillers, glass fibers, and mixtures thereof. In various embodiments, ceramic fillers comprise boron nitride, such as a hexagonal boron nitride. Boron nitride fillers among those useful herein may be in the form of platelets, agglomerates or mixtures thereof, and may have a density of from about 2 to about 2.5 g/cm$^3$, or from about 2.2 to about 2.3 g/cm$^3$, or about 2.25 g/cm$^3$. Particle sizes may have a dimeter, or have a mean or median diameter, of from about 1 to about 200 microns or from about 3 to about 180 microns. Thermal conductivity may be from about 10 to about 150 W/mK, or from about 30-130 W/mK, and volume resistivity of from about $10^8$ to about $10^{13}$ ohm cm. Boron nitride ceramic fillers among those useful herein are commercially available, such as 3M Boron Nitride Cooling Fibers sold by 3M Company (St. Paul, Minn., USA); CarboTherm sold by Saint Gobain (Amherst, N.Y., USA); and boron nitride powder sold by Tokuyama Corporation (Yamaguchi, Japan).

In various embodiments, glass fibers include short glass fibers. For example, glass fibers may be e-type (aluminoborosilicate) glass fibers. Fibers may have a diameter, or have a mean or median diameter, of from 5 to 30 microns, or from 9 to 20 microns, or from 10 to 15 microns or about 13 microns. Fibers may be milled or chopped to have a length, or having a mean or median length, of from 1 to 1300 microns, from 2 to 100 microns, or from 3 to 20 microns, or from 5 to 10 microns, or about 6 microns.

Optional Components:

The compositions of the present technology may optionally comprise optional components to modify physical characteristics or improve processability. In various embodiments, such optional materials may include pigments or other colorants, processing aids, and mixtures thereof. For example, optional components include plastic resins in addition to the LCPs. Optional resins include polyphenylene sulfide (PPS). In various aspects, such optional components may each be present, or present in total, at levels of from about 1 to about 10% by volume.

Formulations:

In general, the TCEI compositions of the present technology comprise an admixture of one or more LCPs, a boron nitride filler, and a glass fiber filler. In some embodiments, compositions comprise a mixture of LCP/filler blends, for example comprising a first blend of LCP and glass fiber and a second blend of LCP and a boron nitride filler.

In various embodiments, compositions comprise at least about 50%, at least about 52%, at least about 55%, or at least about 58% of LCP. Compositions may comprise 75% or less, 70% or less, 65% or less, 60% or less, 58% or less, 55% or less, or 52% or less of LCP. In some embodiments, compositions comprise from about 50% to about 70%, or from about 55% to about 60% (e.g., about 57%) of LCP.

In various embodiments, compositions comprise at least about 20%, at least about 25%, at least about 28%, or at least about 30% of boron nitride filler. Compositions may comprise 45% or less, 40% or less, 38% or less, or 35% or less, or 32% or less of boron nitride filler. In some embodiments, compositions comprise from about 25% to about 40%, or from about 30% to about 35% (e.g., about 31%) of boron nitride filler.

In various embodiments, compositions comprise at least about 1%, at least about 5%, at least about 8%, or at least about 10% of glass fiber filler. Compositions may comprise 25% or less, 20% or less, 18% or less, or 55% or less of glass fiber filler. In some embodiments, compositions comprise from about 5% to about 20%, or from about 10% to about 15% (e.g., about 12%) of glass fiber filler.

For example, the present technology provides a thermally conductive material comprising:

from about 55% to about 60% of liquid crystal thermoplastic;

from about 30% to about 35% of a boron nitride material; and from about 10% to about 15% of glass fiber.

In one embodiment, a thermally conductive material comprises about 57% of liquid crystal thermoplastic;

from about 31% boron nitride material; and from about 12% of glass fiber.

In various aspects, the TCEI materials may be characterized by volume of filler material. For example, materials may comprise at least about 20%, at least about 25% or at least about 30% of filler, by volume. Materials may comprise about 40% or less, or about 35% or less or about 32% or less of filler, by volume. Thus, such materials may comprise from about 25% to about 35%, or from about 30% to about 32% of filler, by volume.

Such compositions may comprise at least about 15%, or at least about 18%, or at least about 20% of boron nitride filler. Such compositions may comprise about 30% or less, or about 25% or less of boron nitride filler. Thus, such materials may comprise from about 20% to about 25% of boron nitride filler, by volume.

Structures and Methods of Manufacturing

In general, the thermally conductive materials of the present technology are made by admixture of an LCP and fillers, using equipment and methods among those known in the art. For example TCEIs may be made by mixing using a twin screw extruder.

TCEIs of the present technology may be used to make a wide variety of structures, such as insulating structures in electrical devices. For example, the present technology provides insulating structures, comprising:

from about 50% to about 70% of liquid crystal thermoplastic;

from about 25% to about 40% of a boron nitride material; and from about 5% to about 20% of glass fiber.

In some embodiments, insulating materials comprise:

from about 55% to about 60% of the liquid crystal thermoplastic;

from about 30% to about 35% of a the boron nitride material; and from about 10% to about 15% of the glass fiber.

Electrical devices include electric motors, such as drive motors in electric vehicles. Electric motors generally comprise a rotor and stator. The stator is a stationary structure which creates a magnetic field, typically consisting of electromagnets or permanent magnets. The rotor rotates within the stator, usually comprising conductors. The magnetic field of the stator exerts force on the rotor, causing the rotor to move within the stator. Such motors may comprise structures comprising TCEI materials of the present technology, such as bobbins, slot liners, encapsulation structures for motor end windings, and electrical wire and buss bar covers.

FIG. 1A is a cross sectional view of an exemplary first electric motor stator 1, comprising a plurality of bobbins 2 of the present technology. Each bobbin 2 has a laminated core 3. Conductors (windings) 4 are wound around the bobbin 2.

Figure 1B:
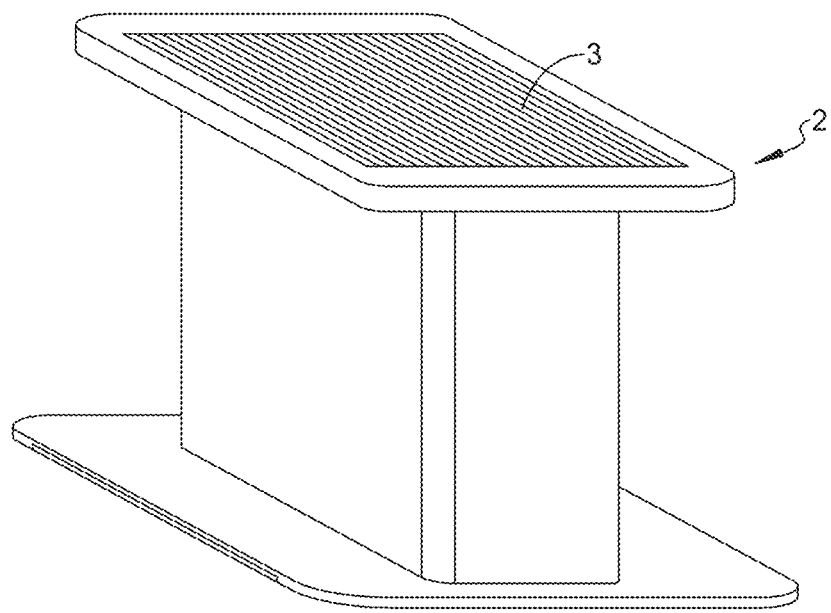
FIG. 1B is a perspective view of a bobbin structure of the present technology, with a laminate core.
Figure 1C:
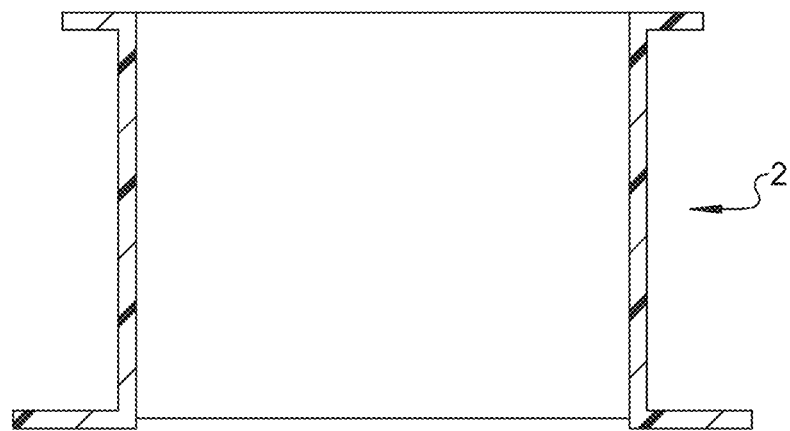
FIG. 1C is a cross-sectional view of a bobbin of the present technology.
Figure 1D:
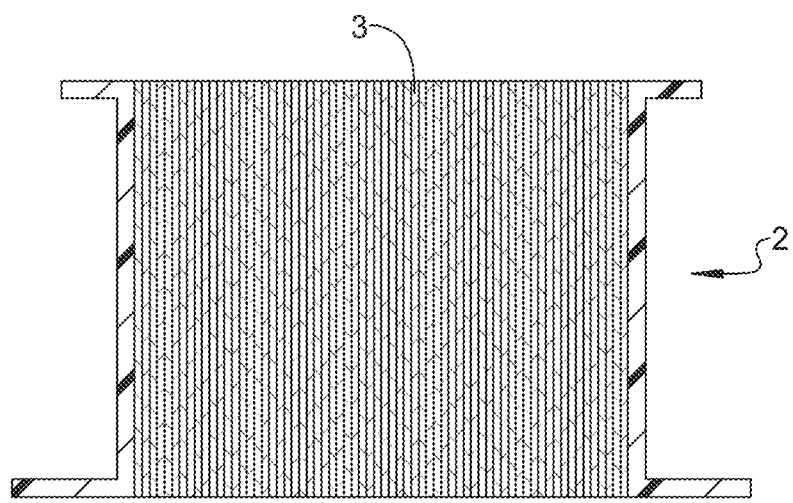
FIG. 1D is a cross-sectional view of a bobbin structure of the present technology, with a laminate core.

FIG. 1B is a perspective view of a bobbin 1, including a laminated core 3. The bobbin 1 is further shown in cross section in FIG. 1C, and in FIG. 1D together with laminated core 3.

Figure 2A:
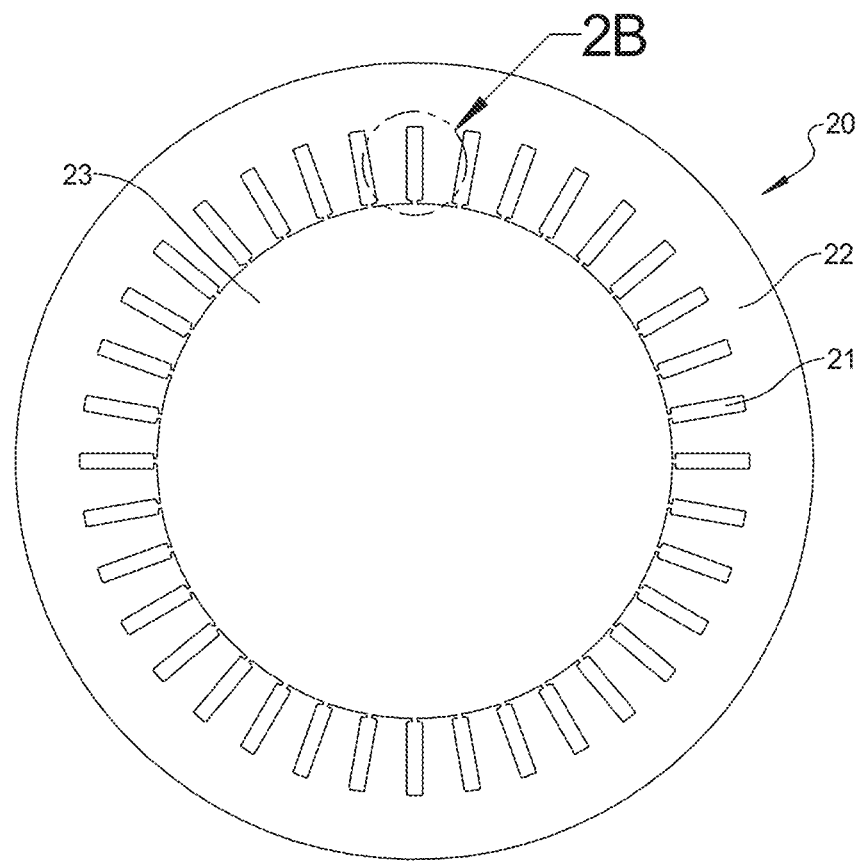
FIG. 2A is a cross sectional view of an electric motor stator having winding slots.
Figure 2B:
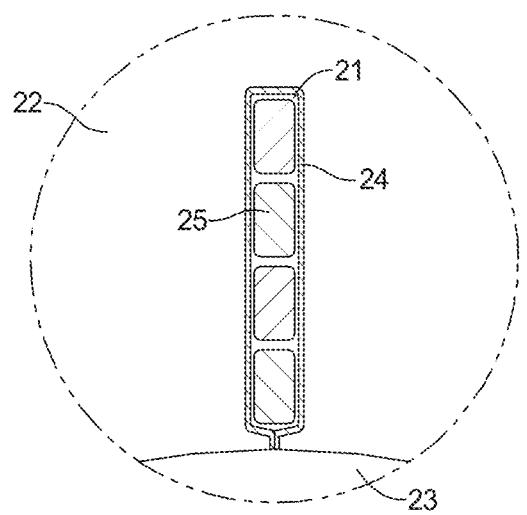
FIG. 2B is a detail view of the stator of FIG. 2A, depicting a slot liner of the present technology.

FIG. 2A is a cross sectional view of a second exemplary electric motor stator 20, comprising a plurality of slots 21 into which conductors (not shown) may be wound. The stator 20 comprises a laminated metal structure 22, and defines a cylindrical void 23 into which a rotor (not shown) may be placed. FIG. 2B provides a detail view of a slot 21 of FIG. 2A. The slot 21 includes a slot liner 24 comprising a TCEI composition of the present technology, which insulates conductors 25 from the laminated metal structure 22. One of skill in the art will appreciate that similar slot structures (not shown), including slot liners of the present technology, may be used in rotors.

Figure 3A:
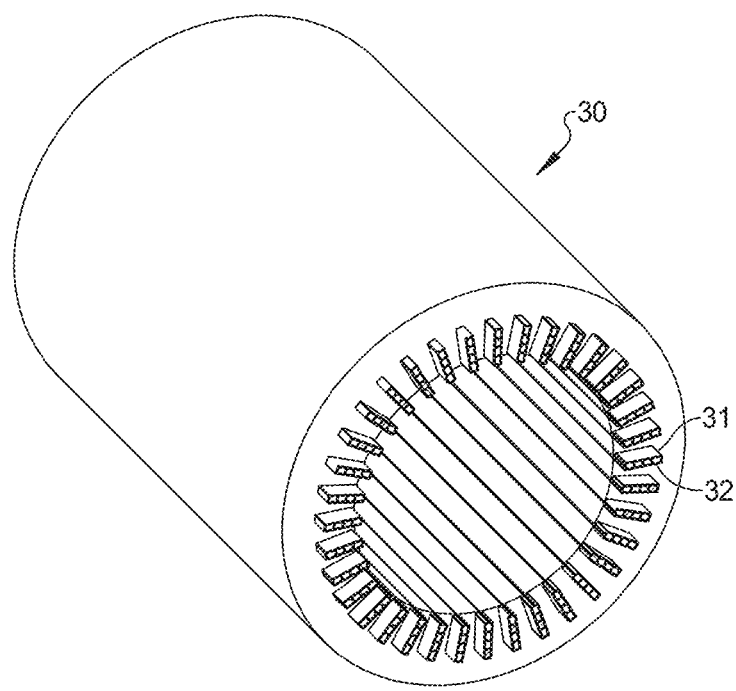
FIG. 3A is a perspective view of an electric motor stator having a plurality of windings.
Figure 3B:
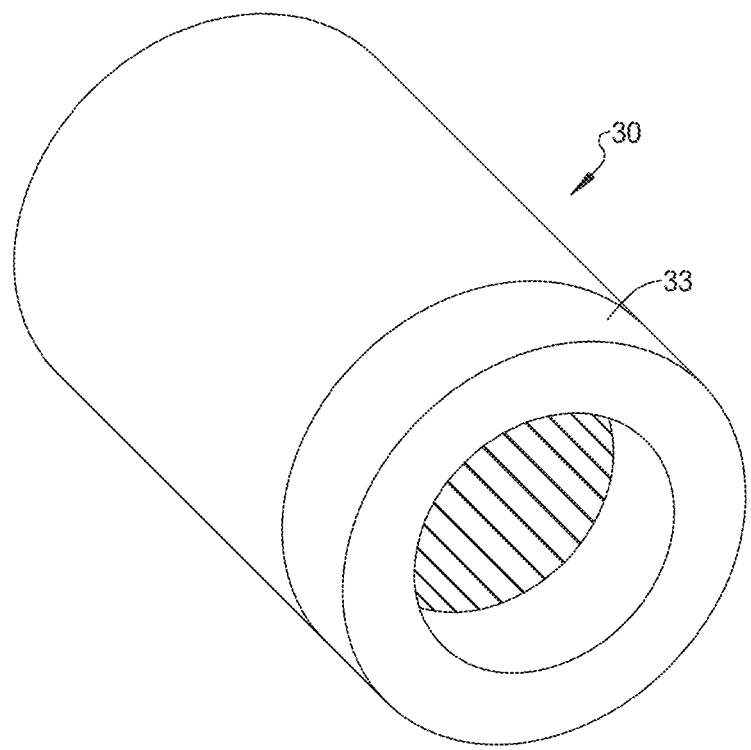
FIG. 3B is a perspective view of an electric motor stator having a winding encapsulation structure of the present technology.

FIGS. 3A and 3B depict another embodiment of the present technology. FIG. 3A is a perspective view of a stator 30, having a plurality of slots 31 and conductor windings 32 disposed in the slots 31. FIG. 3B is a perspective view of the stator 30, wherein an encapsulation cap structure 33, comprising an TCEI composition of the present technology, is covering the slots and windings (not visible).

Embodiments of the present technology are further illustrated through the following non-limiting example.

Example

A thermally conductive thermoplastic material having the following composition.

| Material | Weight % |
|---|---|
| liquid crystal polymer | 57 |
| boron nitride | 31 |
| glass fiber | 12 |

The composition is made by the LCP and into a twin screw extruder. The LCP is melted and mixed in screws then extruded thru die to form strands. The strands are cooled and cut to length to form pellets.

The composition comprises about 30.8% of filler, by volume, including about 23% of boron nitride, by volume. The density is about 1.66 g/cm$^3$. The composition has a volume resistivity of about 2.95 E+13 Ohm-cm, and surface resistivity of about 2.69E+13 Ohm/cm$^2$. The transient plane source measured thermal conductivity with flow and cross flow is about 4.01 W/mK at 25° C., about 3.97 W/mK at 130° C., and about 3.87 W/mK at 170° C. The bulk transient plane source measured thermal conductivity is about 1.56 W/mK at 25° C., about 1.58 at 130° C., and about 1.87 at 170° C. The specific heat capacity (DSC) is about 1.03 J/g/C at °25, about 1.39 J/g/C at 130° C., and about 1.51 J/g/C at 170° C.

An electric motor bobbin is made by injection molding the composition. The resulting bobbin is assembled into a motor, exhibiting good insulating and thermal conductivity properties.

Non-Limiting Discussion of Terminology

The foregoing description is merely illustrative in nature and is in no way intended to limit the technology, its application, or uses. The broad teachings of the technology can be implemented in a variety of forms. Therefore, while this technology includes particular examples, the true scope of the technology should not be so limited since other modifications will become apparent upon a study of the drawings, the specification, and the following claims.

The headings (such as "Background" and "Summary") and sub-headings used herein are intended only for general organization of topics within the present technology, and are not intended to limit the technology of the technology or any aspect thereof. In particular, subject matter disclosed in the "Background" may include novel technology and may not constitute a recitation of prior art. Subject matter disclosed in the "Summary" is not an exhaustive or complete technology of the entire scope of the technology or any embodiments thereof. Classification or discussion of a material within a section of this specification as having a particular utility is made for convenience, and no inference should be drawn that the material must necessarily or solely function in accordance with its classification herein when it is used in any given composition.

It should be understood that one or more steps within a method may be executed in different order (or concurrently) without altering the principles of the present technology. Further, although each of the embodiments is described above as having certain features, any one or more of those features described with respect to any embodiment of the technology can be implemented in and/or combined with features of any of the other embodiments, even if that combination is not explicitly described. In other words, the described embodiments are not mutually exclusive, and permutations of one or more embodiments with one another remain within the scope of this technology. For example, a component which may be A, B, C, D or E, or combinations thereof, may also be defined, in some embodiments, to be A, B, C, or combinations thereof.

As used herein, the phrase at least one of A, B, and C should be construed to mean a logical (A or B or C), using a non-exclusive logical OR, and should not be construed to mean "at least one of A, at least one of B, and at least one of C."

As used herein, the words "prefer" or "preferable" refer to embodiments of the technology that afford certain benefits, under certain circumstances. However, other embodiments may also be preferred, under the same or other circumstances. Furthermore, the recitation of one or more preferred embodiments does not imply that other embodiments are not useful, and is not intended to exclude other embodiments from the scope of the technology.

As used herein, the word "include," and its variants, is intended to be non-limiting, such that recitation of items in a list is not to the exclusion of other like items that may also be useful in the materials, compositions, devices, and methods of this technology. Similarly, the terms "can" and "may" and their variants are intended to be non-limiting, such that recitation that an embodiment can or may comprise certain elements or features does not exclude other embodiments of the present technology that do not contain those elements or features.

Although the open-ended term "comprising," as a synonym of non-restrictive terms such as including, containing, or having, is used herein to describe and claim embodiments of the present technology, embodiments may alternatively be described using more limiting terms such as "consisting of" or "consisting essentially of." Thus, for any given embodiment reciting materials, components or process steps, the present technology also specifically includes embodiments consisting of, or consisting essentially of, such materials, components or processes excluding additional materials, components or processes (for consisting of) and excluding additional materials, components or processes affecting the significant properties of the embodiment (for consisting essentially of), even though such additional materials, components or processes are not explicitly recited in this application. For example, recitation of a composition or process reciting elements A, B and C specifically envisions embodiments consisting of, and consisting essentially of, A, B and C, excluding an element D that may be recited in the art, even though element D is not explicitly described as being excluded herein. Further, as used herein the term "consisting essentially of" recited materials or components envisions embodiments "consisting of" the recited materials or components.

"A" and "an" as used herein indicate "at least one" of the item is present; a plurality of such items may be present, when possible.

Unless specified otherwise, all percentages herein are by weight.

Numeric values stated herein should be understood to be approximate, and interpreted to be about the stated value, whether or not the value is modified using the word "about." Thus, for example, a statement that a parameter may have value "of X" should be interpreted to mean that the parameter may have a value of "about X." The term "about" indicates that the calculation or the measurement allows some slight imprecision in the value (with some approach to exactness in the value; approximately or reasonably close to the value; nearly). If, for some reason, the imprecision provided by "about" is not otherwise understood in the art with this ordinary meaning, then "about" as used herein indicates variations that may arise from ordinary methods of manufacturing, measuring or using the material, device or other object to which the calculation or measurement applies.

As referred to herein, ranges are, unless specified otherwise, inclusive of endpoints and include technology of all distinct values and further divided ranges within the entire range. Thus, for example, a range of "from A to B" or "from about A to about B" is inclusive of A and of B. Further, the phrase "from about A to about B" includes variations in the values of A and B, which may be slightly less than A and slightly greater than B; the phrase may be read be "about A, from A to B, and about B." Technology of values and ranges of values for specific parameters (such as temperatures, molecular weights, weight percentages, etc.) are not exclusive of other values and ranges of values useful herein.

It is also envisioned that two or more specific exemplified values for a given parameter may define endpoints for a range of values that may be claimed for the parameter. For example, if Parameter X is exemplified herein to have value A and also exemplified to have value Z, it is envisioned that Parameter X may have a range of values from about A to about Z. Similarly, it is envisioned that technology of two or more ranges of values for a parameter (whether such ranges are nested, overlapping or distinct) subsume all possible combination of ranges for the value that might be claimed using endpoints of the disclosed ranges. For example, if Parameter X is exemplified herein to have values in the range of 1-10, or 2-9, or 3-8, it is also envisioned that Parameter X may have other ranges of values including 1-9, 1-8, 1-3, 1-2, 2-10, 2-8, 2-3, 3-10, and 3-9.

What is claimed is:

1. An insulating structure in an electrical device, comprising:
    from about 50% to about 70% of liquid crystal thermoplastic;
    from about 25% to about 40% of a boron nitride material; and
    from about 5% to about 20% of glass fiber.

2. The insulating structure of claim 1, comprising:
    from about 55% to about 60% of the liquid crystal thermoplastic;
    from about 30% to about 35% of a the boron nitride material; and
    from about 10% to about 15% of the glass fiber.

3. The insulating structure of claim 1, wherein the device is an electric motor.

4. The insulating structure of claim 3, wherein the structure is a bobbin.

5. The insulating structure of claim 3, wherein the structure is a slot liner.

6. The insulating structure of claim 3, wherein the structure is an encapsulation of motor end windings.

7. The insulating structure of claim 3, wherein the structure is a cover for electrical wires.

8. The insulating structure of claim 1, wherein the liquid crystal thermoplastic is selected from the group consisting of semi-aromatic copolyesters, copolyamides, polyester-co-amides, and mixtures thereof.

9. The insulating structure of claim 1, wherein the boron nitride has a thermal conductivity of from about 30 to about 130 W/mK and volume resistivity of from about $10^8$ to about $10^{13}$ ohm cm.

10. The insulating structure of claim 1, wherein the glass fiber comprises fibers having a diameter of from about 9 to about 20 microns and a length of from about 3 to about 1300 microns.

* * * * *